United States Patent
Anderson

[11] Patent Number: 6,035,595
[45] Date of Patent: Mar. 14, 2000

[54] SELF-SEALING FASTENER

[76] Inventor: Kirk D. Anderson, 9525 Keokuk Ave., Chatsworth, Calif. 91311

[21] Appl. No.: 09/183,094

[22] Filed: Oct. 29, 1998

[51] Int. Cl.[7] ............................... B04B 9/06; F16B 13/04
[52] U.S. Cl. ................................ 52/363; 52/443; 52/410; 52/454; 411/82; 411/258; 411/439
[58] Field of Search .......................... 52/443, 445, 454, 52/361, 362, 363, 366, 410; 411/23, 82, 258, 369, 542, 439, 440, 441, 932

[56] References Cited

U.S. PATENT DOCUMENTS

| | | |
|---|---|---|
| 975,310 | 11/1910 | de barrondo . |
| 1,102,871 | 7/1914 | Carroll . |
| 1,473,497 | 11/1923 | Monckton ........................... 411/439 X |
| 1,561,518 | 11/1925 | Graham . |
| 1,763,264 | 6/1930 | Shanks . |
| 1,767,565 | 6/1930 | Thrift et al. . |
| 1,792,217 | 2/1931 | Farr . |
| 1,857,158 | 5/1932 | Maloney ............................. 411/439 X |
| 2,439,516 | 4/1948 | Holcomb ................................ 174/159 |
| 2,666,354 | 1/1954 | Dim et al. ........................... 411/369 X |
| 3,298,271 | 1/1967 | Krueger ..................................... 85/32 |
| 3,362,276 | 1/1968 | Gould ......................................... 85/8.6 |
| 3,519,704 | 7/1970 | Maginnis ................................... 264/69 |
| 4,555,206 | 11/1985 | Sweeney .................................. 411/23 |
| 4,588,152 | 5/1986 | Ruehl et al. ............................... 248/71 |
| 5,281,065 | 1/1994 | Wu ........................................ 411/258 |
| 5,443,345 | 8/1995 | Gupta ................................. 411/442 X |

*Primary Examiner*—Michael Safavi
*Assistant Examiner*—Winnie Yip
*Attorney, Agent, or Firm*—Cislo & Thomas LLP; David L. Hoffman, Esq.

[57] ABSTRACT

A self-sealing furring nail has a nail and a furring wad assembly. The furring wad assembly includes a plunger friction fit on the nail and a housing friction fit on a shaft of the plunger at one end of the housing, and at the other end of the housing there is a gap between the housing and the nail. The activating surface of the plunger is located within the housing, and the plunger's shaft extends from within the housing outside of the housing towards the nail head. The housing has a package of sealant material inside. The package has a sealant encased within a burstable bag. When the furring nail is driven through building paper into a frame of a building, the head of the nail contacts the plunger's shaft causing the plunger's activating surface to compress the bag of sealant. The bag bursts and the sealant passes through the gap between the nail and housing and seals the penetration hole between the nail and the building paper. Instead of a bag of sealant, the sealant may be a tar-like substance preferably formed in a cone-shape. The nail may also be provided with a hook affixed thereto proximate the head of the nail for use in catching and holding corner reinforcing wire.

20 Claims, 2 Drawing Sheets

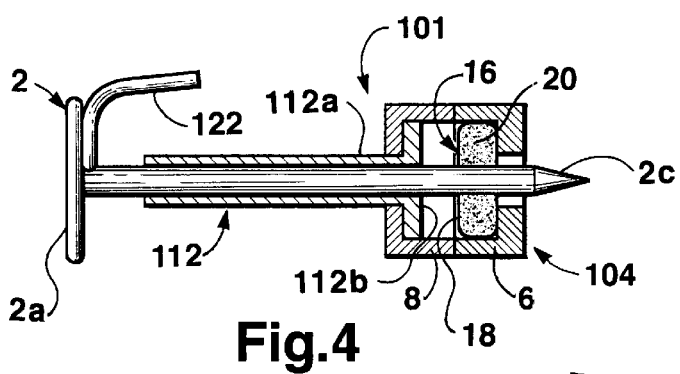
Fig.4
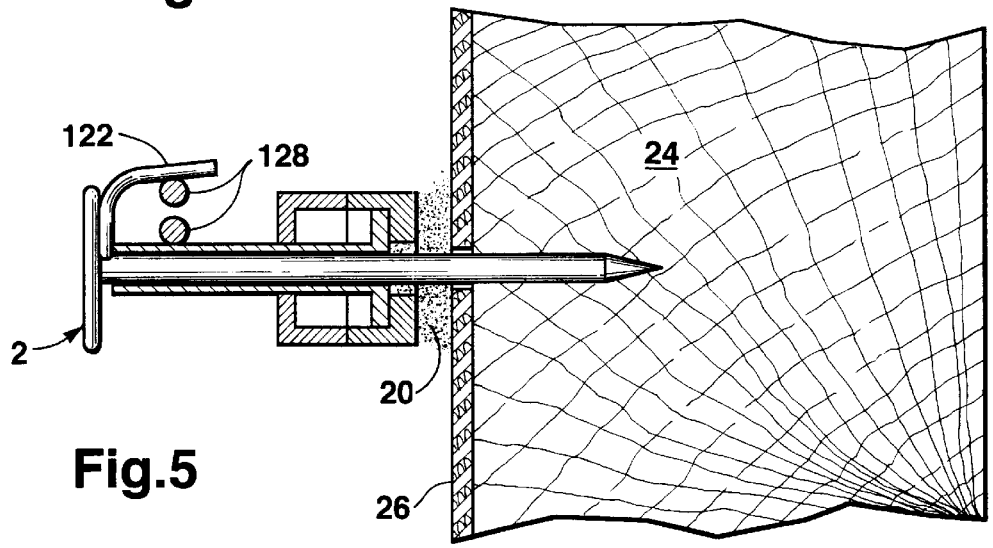
Fig.5
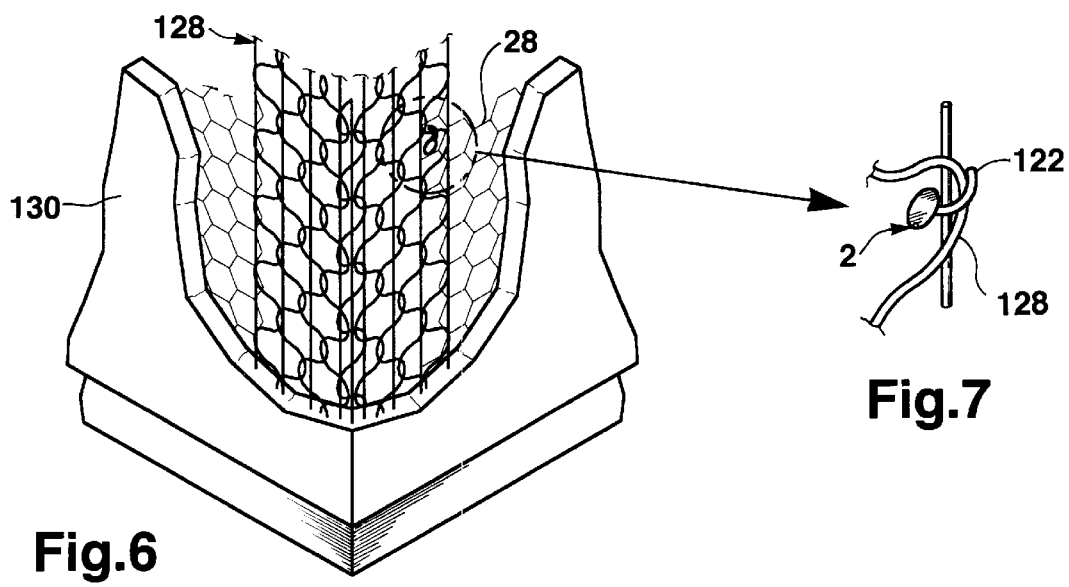
Fig.6
Fig.7

SELF-SEALING FASTENER

BACKGROUND OF THE INVENTION

Field of the Invention

This invention relates to a self-sealing fastener, and in particular, a self-sealing furring nail.

In the building industry, sealing out water, which can cause many problems, is always desirable. In fact, making structures watertight against rainwater, irrigation water, and any other moisture is a primary concern. Unfortunately, the materials which work well as an exterior coating, such as plaster and stucco (hereinafter, "stucco"), do not provide a watertight seal. The stucco exterior is breathable by design, so that it will air-out and dry naturally. Otherwise, entrapped water would mold, mildew or create freezing and thawing, or other problems associated with waterproof exterior systems. Therefore, the stucco can become saturated from rainwater, and may also have leaks due to cracking. The water seal is actually provided by building paper, which is typically a black paper wrapped around and stapled to the framing of a home or other structure.

When the exterior stucco becomes saturated during a rainstorm, water works its way through the stucco to the building paper. The water then flows downward and out the bottom of the stucco wall. The remaining moisture in the stucco will air out.

As can be seen from above, it is important, particularly during construction, to maintain the integrity of the building paper. Most competent builders and contractors are aware that leaks can occur through the building paper and attempt to seal certain large penetration holes, such as at electrical outlets, gas and water pipes and other large penetrations. Typically, a sealant is applied with a caulking gun. However, little attention is paid to the most numerous form of penetration hole in the building paper. That is, the furring nails which are used to support lath wire on which the stucco is applied.

In a typical residence, the nails are six inches (6") apart vertically and three inches (3") apart around the perimeter, so there may be twenty-five to thirty thousand or more furring nails. Every one of these nails creates a potential penetration point for water. Though small, these holes can often leak. Moreover, due to movement of the building paper during construction, the holes can become enlarged or torn. Because caulking all these penetration holes would be very labor intensive, and because not all of these holes leak, they are ignored.

Understanding the construction of a stucco exterior aids in understanding why caulking is impractical. After the building frame is completed, building paper is wrapped around it, or around plywood reinforcing if such reinforcing is used, and stapled to the framing. Then the lath wire is positioned around the building paper and held in place by the furring nails. The nails not only hold the building paper on the framing but also support the lath wire. The nails have what is known as a furring wad on them. The wad essentially serves to space the lath wire from the building paper and typically is made out of cardboard. Once the nails are in place, the stucco is applied as is well known in the art.

As noted above, although one of the most common entry points for water is through holes created by furring nails, this is ignored. Yet, if water intrusion occurs, it is extremely difficult and expensive to attempt repairs. The homeowner or building owner will have to either "live with the problem," or endure repair. The repair would involve first opening up the exterior stucco to the building paper. Even if this can be done without damaging the paper, the repair next involves caulking each penetration hole from the furring nails in the section where the leak is occurring, then putting up new lath wire and new stucco. This will probably necessitate using new furring nails and further caulking those new nails.

Furring nails and stucco construction have been used for a very long time. For example, U.S. Pat. No. 1,767,565 issued Jun. 24, 1930 to M. B. Thrift et al. discloses a furring device, in particular for metallic glass. The nail has a stop for a spacer which is resilient. The spacer spaces glass from a sheet and the nail goes into the studs. The resilient spacer is thus an attempt to provide a seal. However, this furring nail is not used for building paper and lath wire. Moreover, a resilient member will not ensure a seal, particularly if the penetration hole has been enlarged by tearing or rubbing.

SUMMARY OF THE INVENTION

In one embodiment, the invention provides a self-sealing furring nail. The nail has a furring wad assembly with a housing mounted axially on the nail in place of a standard furring wad and having dimensions comparable to that of a standard furring wad. The housing is preferably formed in two pieces, a top case and a bottom case. Both are preferably cylindrical with one end substantially closed. A plunger is mounted on the nail shank. The top case member is mounted on a shaft of the plunger, with the plunger activating surface located inside the housing, and the shaft extending outside the housing toward the nail head. The bottom case member is affixed to the top case member along the free cylindrical edges, and has a gap at its closed end around the nail shaft. There is a sealant package located inside the housing, preferably proximate the end of the bottom case. The sealant package includes a sealant material preferably encased within a burstable bag. In response to nailing the furring nail into structural framing through the building paper, the nail head contacts the plunger shaft and presses the plunger activating surface against the sealant package. The sealant package bursts and the sealant is pushed through the gap to seal the penetration hole at the nail and building paper. The housing serves as a furring wad in its spacing function as well. The length that the plunger shaft extends out from the housing is preferably about the same length as that of the interior of the housing minus the thickness of the plunger's activating surface.

In another embodiment, the furring nail is modified for use in holding corner reinforcing ia wire spaced from standard lath wire. The modifications, in a preferred embodiment, include providing a hook-like element fixed to the nail head for hooking the corner reinforcing wire, and lengthening the plunger shaft, given that in this application the nail is preferably not driven all the way home.

BRIEF DESCRIPTION OF THE DRAWINGS

FIG. 4 is a sectional view of a self-sealing furring nail in accordance with another embodiment of the invention;

FIG. 5 is a view similar to that of FIG. 2 but using the furring nail of FIG. 4;

FIG. 6 is a view similar to that of FIG. 3 but showing the furring nail of FIG. 4 being used to hold a corner reinforcing wire; and FIG. 7 is an enlarged view of a circled portion of FIG. 6 showing the furring nail and its engagement with a section of the corner reinforcing wire.

DESCRIPTION OF THE PREFERRED EMBODIMENT(S)

The detailed description set forth below in connection with the appended drawings is intended as a description of a presently preferred embodiment of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequence may be accomplished by different embodiments that are also intended to be encompassed within the spirit and scope of the invention.

Figure 1:
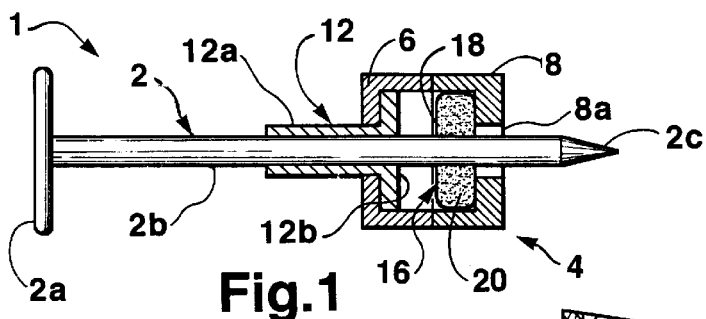
FIG. 1 is a sectional view of a self-sealing furring nail in accordance with a first embodiment Oft invention.
Figure 2:
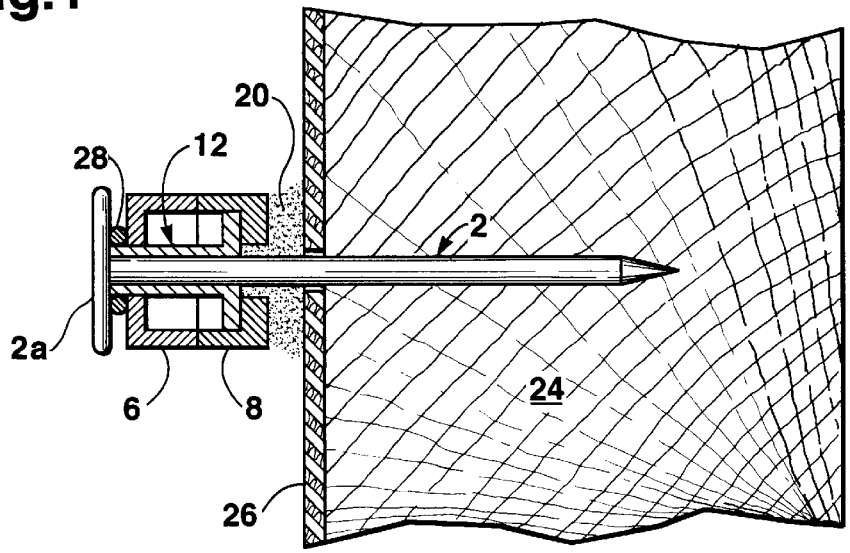
FIG. 2 is a sectional view showing the furring nail of FIG. 1 in its deployed position for supporting a lath wire and holding building paper against a frame member in accordance with the first embodiment of the invention.
Figure 3:
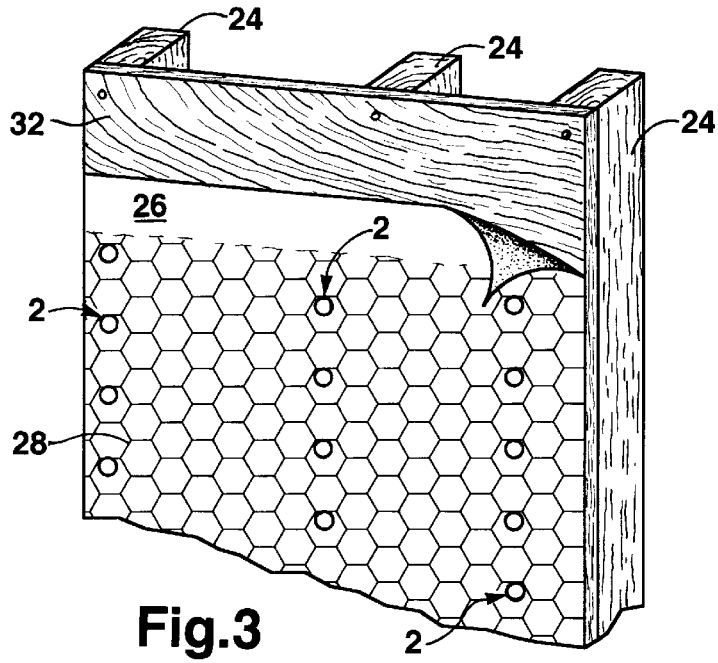
FIG. 3 is a partial cut-away view showing an exterior section of a structure in which self-sealing furring nails in accordance with the first embodiment of the invention have been used.

In a preferred embodiment, the invention provides a furring nail that is self-sealing. With reference to FIGS. 1–3, a first embodiment of the invention will now be described. A furring nail assembly 1 includes a nail 2 and a furring wad assembly 4. The furring wad assembly includes a housing having a top case 6 and a bottom case 8, a plunger 12 and a sealant package 16. The top and bottom case members have cylindrical bodies which preferably mate at their free edges. These edges may be adhered together by adhesive, threaded together or affixed or held together in any other manner as would be evident to one of ordinary skill in the art. The plunger 12 has a shaft 12a which extends through an aperture in the top case member. The shaft 12a may be friction fit on the nail shank 2b, and the top case member may be friction fit on the plunger's shaft.

The sealant package 16 is located within the case formed by the top and bottom case members, and preferably lies against the inside portion of the bottom case member closest to the nail point 2c and a gap 8a in the closed end of the bottom case. The sealant package may be friction fit, adhered or otherwise held in place. The package could also be adhered to the surface of the plunger or just disposed in place. The package preferably has a donut shape and includes a casing 18 preferably of a thin, flexible, rupturable material like that of plastic wrap or a plastic bag. Inside the casing, sealant material 20 is a caulking material, such as a silicone sealant, e.g., OTP 900™ or RAINBUSTER™ made by Tops of Van Nuys, Calif. In place of the sealant package 16, a wad of tar-like material such as BITUTHANE™ made by W.R. Grace and Co. of Cambridge, Mass. may be used. The tar-like material preferably does not have the casing and is preferably in the form of a cone-shape with a central bore and the frustrum facing the gap.

The operation of the device will now be explained with specific reference to FIGS. 2 and 3. Building paper 26 is placed around the studs 24 (and where plywood is used over the plywood 32). Then, a wire lath 28 is placed over the building paper and furring nails are driven through the building paper 26 into the plywood 32 and/or stud 24, such that the wire lath 28 rests against the top, outer side of the furring wad. The nails are driven all the way home, with preferably at least some of the nails, if not all, wedging the wire lath 28 between the furring wad and nail head 2a.

With the furring nail assembly according to the present invention, the furring wad is replaced by the furring wad assembly, which when the nail is driven fully home, activates the self-sealing function of the assembly. Specifically, the nail head 2a and/or lath wire being sandwiched will drive the plunger by hitting the end of the plunger shaft 12a and driving it so as to compress and burst the sealant package, or press the tar-like material, so that the sealant passes through the gap. Preferably, the activation surface 12b of the plunger will be of a size such that the sealant is forced through the aperture or gap 8a. The sealant 20 will thus be iv pushed through the gap and provide a seal around the nail shank 2b in the area of the penetration hole formed by the nail entering the building paper. The sealant will also cover any enlargements of the hole or small tears in the building paper at the penetration hole due to shifting of the building paper during the construction process caused by wind or other accidental movement or pressure on the building paper.

As is evident from the drawings, the length of the portion of the plunger shaft 12a extending outside the case is preferably equal to the distance between the inside of the bottom case member to the face 12b of the plunger. In addition, the diameter of the plunger's activating surface should be approximately equal to, or just slightly less than, the diameter of the inside of the case.

The plunger and housing may be made of a strong plastic, metal, or other suitable material, and need not be the same material. In accordance with another aspect of the invention, the housing and/or plunger may have a high-visibility color such as yellow, orange or bright red, to assist in the construction process.

A second embodiment of the invention is shown in FIGS. 4 through 7. This embodiment is suitable for attaching a corner reinforcing wire, such as a welded corner reinforcing wire, e.g., CORNER AID™ sold by Harlan Metal Products, Inc. of Compton, Calif., which provides reinforcement at the corners of the building for the stucco. The corner wire is applied around the lath wire. It is normally placed there after the furring nails have been driven home but before any stucco is applied. The corner wire has heretofore been hung on regular nails typically driven about ⅞" to 1" deep into the framing. Furring nails are not used. The furring wad tends to get in the way when driving the nails because corner wire has narrow openings. Nevertheless, these nails still make penetration holes. Therefore, the second embodiment of the invention provides a furring nail suitable for use with corner reinforcing wire.

In the second embodiment, like parts to the first embodiment are given like reference numerals. A corner nail assembly 101 is constructed generally similar to the furring nail assembly 1 of FIG. 1, but plunger 112 has a longer shaft 112a such that a furring wad assembly 104 is activated by driving the nail a shorter distance than the activation distance of the embodiment of FIG. 1. This shorter distance is necessary to accommodate the fact that the corner reinforcing is located at a greater distance from the studs than the lath wire.

Typical corner wire 128 is normally supported by driving the nail between a straight portion and curved portion of the reinforcing, as shown in FIG. 6. Because a typical furring wad would not fit through this area, and it would be cumbersome to manipulate the wire and furring nail to put it in place, the furring nail of this embodiment has a hook member 122 welded, integrally formed, or unitary with the nail head and/or shank. The hook member 122 allows the nail to be driven into the stud proximate but outside the area formed by the curved and straight sections of the corner reinforcing wire, and the hook then catches this corner wire in that area. The penetration hole created by the nail is sealed in the same manner as in the embodiment of FIGS. 1 to 3. As shown in FIG. 7, the hook catches the curved and straight portions of the corner wire, but it may also go between the curved and straight wire.

Once all the nails and wire are all in place, stucco 130 is applied. Typically it is applied in three layers, namely, a scratch coat, a brown coat and a finish coat, as is well known in the art.

In place of the lath wire shown in FIGS. 3 and 6, sometimes lath wire that comes preassembled with the building paper attached is used, commonly called sheet lath. The invention may readily be used with this kind of lath wire as well, because nails are used to support the lath wire as it must carry the weight of the stucco.

While the present invention has been described with regards to particular embodiments, it is recognized that additional variations of the present invention may be devised without departing from the inventive concept.

What is claimed is:

1. A self-sealing furring nail for fastening building paper to framing of a structure and for supporting and spacing lath wire from the building paper, the self-sealing furring nail comprising:
   a nail having a shank, a point and a head;
   a furring wad assembly, the assembly including:
      a housing mounted around the shank;
      a plunger mounted on the shank, and having an activating member located within the housing and a shaft extending out of the housing; and
      a sealant material located within the housing between the plunger activating member and the end of the housing proximate the nail point,
   wherein there are means for defining an opening in the housing at a portion of the housing facing the nail point, whereby when the nail head is driven into the framing, the nail head presses on the plunger shaft causing the plunger activating member to push on the sealant, which in response thereto exits the housing in the direction of the nail point through the opening.

2. The self-sealing furring nail of claim 1, wherein the housing is formed in first and second pieces.

3. The self-sealing furring nail of claim 1, wherein the sealant is disposed within a burstable package.

4. The self-sealing f g nail of claim 1, wherein the opening is formed in the housing concentrically with the nail shank for providing a gap between the housing and the nail shank proximate the opening.

5. The self-sealing furring nail of claim 1, wherein the plunger is friction fit on the nail, and the housing is friction fit on the plunger shaft.

6. The self-sealing furring nail of claim 1, further comprising a hook fixed to the nail proximate the head of the nail for engaging corner reinforcing wire.

7. The self-sealing furring nail of claim 6, wherein the plunger's shaft has a length substantially longer than the interior longitudinal length of the housing.

8. The self-sealing furring nail of claim 1, wherein the plunger's shaft has a length extending out from the housing substantially corresponding to a longitudinal inner dimension of the housing minus a thickness of the plunger's activating member.

9. The self-sealing furring nail of claim 1, wherein at least one of the housing and the plunger has a high-visibility color thereon selected from the group of yellow, orange and red.

10. An exterior assembly for a structure, the assembly comprising:
    lath wire;
    building paper mounted on framing for the structure;
    a plurality of furring nails holding the lath wire and building paper and being driven into the framing, each of the furring nails comprising:
       a nail having a shank, a point and a head; and
       a furring assembly, the furring assembly including:
          a housing mounted on the shank, a plunger mounted on the shank having an activating member located within the housing, and a shaft extending out of the housing; and a sealant material located within the housing between the plunger activating member and an end of the housing proximate the nail point, wherein there are means for defining an opening in the housing at the end of the housing facing the nail point; and
    wherein in response to the nail being driven into the framing, the sealant seals the penetration hole formed by the nail point in the building paper around the nail to form a watertight seal.

11. The exterior assembly of claim 10, wherein the housing is formed in first and second pieces.

12. The exterior assembly of claim 11, wherein at least one of the housing and the plunger has a high-visibility color thereon selected from the group of yellow, orange and red.

13. The exterior assembly of claim 10, wherein the sealant is disposed within a burstable package.

14. The exterior assembly of claim 10, wherein the opening is formed in the housing concentrically with the nail shank for providing a gap between the housing and the nail shank proximate the opening.

15. The exterior assembly of claim 10, wherein the plunger is friction fit on the nail, and the housing is friction fit on the plunger shaft.

16. The exterior assembly of claim 10, further comprising a hook fixed to the nail proximate the head of the nail.

17. The exterior assembly of claim 15, wherein the assembly further comprises a corner reinforcing wire, the corner reinforcing wire being disposed over the lath wire, and some of the furring nails being disposed such that the hook contacts and holds the corner reinforcing wire.

18. The exterior assembly of claim 17, wherein the plunger's shaft for the furring nails having the hook has a length substantially longer than the interior longitudinal length of the housing.

19. The exterior assembly of claim 10, further comprising stucco disposed on the lath wire and adjacent the building paper.

20. The exterior assembly of claim 10, wherein the plunger's shaft has a length extending out from the housing substantially corresponding to a longitudinal inner dimension of the housing minus a thickness of the plunger's activating member.

* * * * *